(12) United States Patent
Akimoto

(10) Patent No.: US 6,358,571 B1
(45) Date of Patent: Mar. 19, 2002

(54) METHOD FOR COATING METAL SUBSTRATE

(75) Inventor: Yasuichi Akimoto, Tokyo (JP)

(73) Assignee: Denka Himaku, Inc., Tokyo (JP)

( * ) Notice: Subject to any disclaimer, the term of this patent is extended or adjusted under 35 U.S.C. 154(b) by 0 days.

(21) Appl. No.: 09/405,199

(22) Filed: Sep. 24, 1999

(30) Foreign Application Priority Data

Oct. 28, 1998 (JP) ............................................. 10-307091

(51) Int. Cl.[7] .................................................. C08J 7/04
(52) U.S. Cl. ................. 427/498; 427/248.1; 427/388.1; 427/435; 427/443.2; 427/487; 427/512; 427/528; 427/551; 427/557; 427/558

(58) Field of Search ............................... 427/498, 248.1, 427/388.1, 435, 443.2, 487, 512, 528, 551, 557, 558

*Primary Examiner*—Bernard Pianalto
(74) *Attorney, Agent, or Firm*—Rader, Fishman & Grauer, PLLC; Ronald P. Kananen

(57) ABSTRACT

A method for coating a metal substrate in which a coating film is applied reliably and strongly on a surface processed film on a metal matrix material. The coating method for the metal substrate includes an immersion step of immersing a surface-processed metal substrate in a solution mainly composed of an amorphous-like fluorine resin, a polymerization step of polymerizing the amorphous-like fluorine resin and the surface processed metal substrate, and a step of forming a coating film on a surface-processed surface of the metal substrate.

7 Claims, 1 Drawing Sheet

METHOD FOR COATING METAL SUBSTRATE

BACKGROUND OF THE INVENTION

1. Field of the Invention

This invention relates to a coating method for a metallic surface for applying a thin film on the surface of metal by surface processing, such as plating. More particularly, it relates to a coating method for a metallic surface for applying a thin film mainly composed of an amorphous-like fluorine resin.

2. Description of the Related Art

In a metallic object, employing a metallic material, it needs to be improved in wear resistance, corrosion resistance and resistance against chemicals, depending on the objective of use. That is, metallic objects are improved in wear resistance, corrosion resistance and resistance against chemicals by being subjected to various surface processing operations.

Specifically, metal surfaces are modified by, for example, anodic oxidation processing, chemical conversion coating and plating processing. In particular, if Al, Mg, Ti or an alloy thereof is used, anodic oxidation processing or chemical processing is executed using an electrolytic solution mainly composed of acid, whereas, if Fe or other metal is used, a variety of plating processing operations are executed by electrical or chemical methods.

However, in a surface processed film, obtained by this surface processing, there exist gaps, such a fine pores, holes, crevices or micro-irregularities. For example, in an alumite film, obtained on anodic oxidation processing of an Al alloy, for example, fine pores not larger than 100 nm are produced in the cell in the course of the alumite film growth process. Also, in a surface processed film of Al or Mg alloys, random holes and micro-irregularities are produced by so-called break-down. In the plating processing or chemical conversion coating, crevices or cracks are formed due to stress in generating surface processed films. Specifically, in a Cr plated film or in a chromated film, obtained on plating processing or on chemical conversion coating, crevices or holes of approximately 1 $\mu$m or less in size are inevitably produced.

Thus, the above-described surface processing cannot be said to be sufficient in improving wear resistance, corrosion resistance and resistance against chemicals. Moreover, the surface processed as described above is affected by foreign matter intruded and deposited in the fine holes or crevices present in the processed surface.

For example, in a metal mold used for molding a semiconductor device, resins tend to be affixed to the cavity surface to deteriorate resin releasing properties. Also, in a mold used for bending pins of lead frames, it is a frequent occurrence that Pb plating films on the lead frame surface become affixed to the mold to cause changes in the bending angle of the pins of the lead frames. Moreover, in a metal mold used for molding the rubber or molding synthetic resin vessels, it is a frequent occurrence that molding materials are affixed to the cavity surface to produce molded products unsatisfactory in shape or in luster.

This is thought to be presumably due to holes or crevices formed in the metal surface constituting the cavity.

Moreover, the water using sites in homes, such as the back sides of city water taps, tend to be contaminated inevitably to produce a non-hygienic state. On the other hand, a rotor of a centrifuging machine used for blood inspection is washed for disinfection and hence tends to be attacked if the rotor is coated only with an alumite film. It is felt that the fine holes or crevices formed in surface processed films account for contamination or infection.

For solving the problems attributable to the fine holes or crevices formed in surface processed films of a metal article, it has been proposed to form a crystalline fluorocarbon resin, such as polytetrafluoroethylene (PTFE) on a surface processed film of a metal article. There is, for example, a method of forming a crystalline fluorocarbon resin, such as polytetrafluoroethylene (PTFE), on an alumite processed Al surface. Specifically, the pores or holes in the alumite film may be stopped by impregnating PTFE two to several $\mu$m in diameter dispersed in lukewarm water, as disclosed in Japanese Patent Publication S39-6113 1.

There is also such a technique in which a Cr plated film presenting fine holes or crevices is etched by a reverse current supplying method to enlarge the crevices or holes to a width of 3 to 10 $\mu$m and in which the film so processed is impregnated with PTEF in an oven heated to a temperature of approximately 200° C. at a pre-set pressure and cooled down. Since this can enlarge the diameter of the crevices and holes to approximately 3 to 10 $\mu$m, it is possible to impregnate the inside of the crevices or holes having the diameter of the order of a few $\mu$/m.

However, if an alumite film is formed by anodic oxidation processing on the surface of a metal article employing Al or Al alloys, ultra-fine holes or crevices are produced in the alumite film. If, in such case, the holes or crevices are increased in width by a technique such as the reverse current supplying method, the holes or crevices formed in the alumite film can be enlarged only to the size of the order of 100 mn. Therefore, if a thin film is formed with PTEF with the particle size of the order of a few $\mu$m, the fine holes or crevices on the alumite film surface cannot be hidden such that simply PTFE particles ride on the fine holes or crevices.

Thus, if a crystalline fluorine-based resin film is formed on an alumite film, it is peeled off in a shorter time such that superior surface properties cannot be maintained for prolonged time.

On the other hand, a Cr plated film can be etched by the reverse current supplying method so that PTEF or the line crystalline fluorine resin can be formed to the inner recesses in the holes or crevices provided that the holes or the crevices are enlarged in diameter, as discussed above. However, in such case, the Cr plated film needs to be of a film thickness of at least 30 $\mu$m. If, with the Cr plated film having a film thickness not larger than 30 $\mu$m, the holes or crevices are increased in diameter, there are occasion wherein these holes or crevices reach the lower layer of a matrix material.

Thus, with the Cr plated film, the matrix material may be corroded due to the holes or crevices, or the Cr plated film itself tends to be peeled off.

SUMMARY OF THE INVENTION

It is therefore an object of the present invention to provide a coating method for a metal substrate whereby a coating film can be foiled reliably and strongly on a surface processed film formed on a metal matrix material, and a metal material obtained in this manner.

In one aspect, the present invention provides a method for coating a metal substrate including an immersion step of immersing a surface-processed metal substrate in a solution mainly composed of an amorphous-like fluorine resin, a polymerization step of polymerizing the amorphous-like fluorine resin and the surface processed metal substrate, and a step of forming a coating film on a surface-processed surface of the metal substrate.

In the present coating method for a metal substrate, according to the present invention, the amorphous-like fluorine resin is polymerized on the surface-processed surface. With this technique, since the amorphous-like fluorine resin is used, this amorphous-like fluorine resin is intruded into fine holes or crevices to constitute a coating film.

In another aspect, the present invention provides a metallic material including a metal substrate made up of a metal matrix material and a surface processed film, layered thereon, and a coating film obtained on polymerizing an amorphous-like fluorine resin on a surface of the metal substrate. The surface processed film is obtained on surface processing the metal matrix material, In the metallic material of the present invention, the amorphous-like fluorine resin is polymerized to the surface of the metal substrate, that is to the major surface of the surface processed film obtained on surface processing. In the present metallic material, the amorphous-like fluorine resin can be intruded into fine holes and crevices formed in the metal substrate surface, so that the metallic material has a strong coating film insusceptible to peeling.

With the metal material coating method according to the present invention, in which the amorphous-like fluorine resin is polymerized on a surface-processed metal substrate, coating can be achieved reliably. Thus, with this technique, a coating film can be formed reliably even on a surface presenting extremely fine holes or crevices.

With the metal material of the present invention, the coating film polymerized on the surface-processed metal substrate is mainly composed of the amorphous-like fluorine resin. Thus, the present metal material is superior in intimate bonding between the metal substrate and the coating film, so that the meritorious effect of improving surface properties by the coating film can be maintained for prolonged time. Therefore, the present metal material can be used with advantage for various types of metallic products.

DESCRIPTION OF THE PREFERRED EMBODIMENTS

Figure 1:
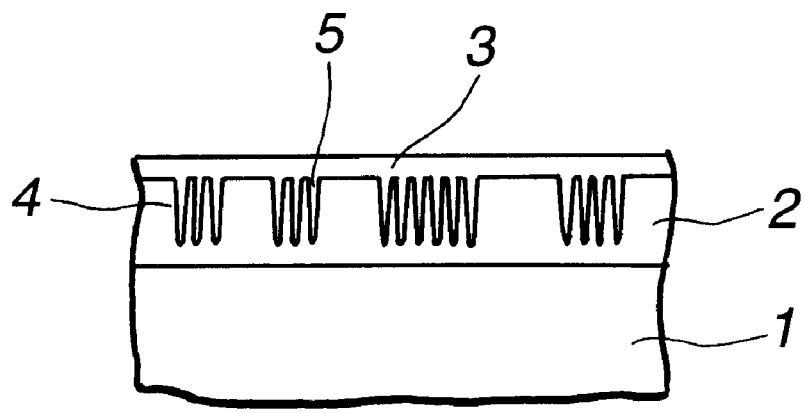
FIG. 1 is a schematic view showing a metallic material according to the present invention.

Referring to the drawings, preferred embodiments of the coating method for a metal substrate and the resulting metallic material according to the present invention will be explained in detail.

Referring to FIG. 1, the metallic material of the preferred embodiment is prepared by surface processing a metal matrix material 1, formed of Al, Al alloys, Mg, Mg alloys, Ti, Ti alloys, Fe or Fe alloys, to form a surface processed film 2 on the surface of the metal matrix material 1, and by subsequently polymerizing an amorphous fluorine resin on the surface processed film 2 to generate a coating film 3.

In this metallic material, the surface processed film 2 may be enumerated by a plating film, formed by a variety of plating operations, an anodic oxidized film, formed by anodic oxidation processing, a coating film, obtained on chemical conversion coating, and a vapor deposited film obtained on vapor deposition. If the surface of the metal matrix material 1 is surface-processed in this manner, extremely fine holes 4, with a diameter not larger than 2 μm, or extremely fine crevices 5, with a width not larger than 2 μm, are produced in the resulting surface processed film 2.

Also, in the present metallic material, a coating film 3 is formed on the surface processed film 2 having the holes 4 and the crevices 5. This coating film 3 is formed by polymerizing an amorphous fluorine resin on the surface of the surface processed film 2.

The amorphous fluorine resin constituting the coating film 3 means such a resin comprised of a polymer chain formed on polymerization of a fluorine-containing monomer and which cannot assume a pre-set crystal state but continues to assume an amorphous state. Such amorphous fluorine resin, being non-crystalline, is superior in dissolution characteristics in pre-set solvents. Since this amorphous fluorine resin is in the non-crystalline state even if it is in a dissolved state, it can be intruded into the inside of the fine hole 4 or crevice 5 formed in the surface of the surface processed film 2.

Also, in the present metallic material, this coating film 3 is not limited to a film of a single layer structure mainly composed of an amorphous fluorine resin. Thus, the coating film 3 may be of a multi-layered structure. If the coating film 3 is of a multi-layered structure, the amorphous fluorine resin, constructed as described above, is coated with another amorphous fluorine resin or crystalline fluorine resin.

Among crystalline fluorine resins, there are, for example, polytetrafluoroethylene (PTFE), polyvinylidene fluoride (PVDF), polyvinyl fluoride (PVF), a tetrafluoroethylene fluoro alkyl bi-ether copolymer (PFA) and a tetrafluoroethylene hexafluoro pyrene copolymer (FE).

If the coating film 3 is of a multi-layered structure, the amorphous-like fluorine resin is polymerized in the surface of the surface processed film 2, with the fluorine resin constituting the second layer being polymerized with this amorphous-like fluorine resin. Thus, even if the coating film 3 is of the multi-layered structure, tight bonding between the surface processed film 2 and the coating film 3 is excellent, whilst the layer constituting the surface side of the coating film 3 is improved further in surface characteristics.

Specifically, a product manufactured by ASAHI GLASS CO. LTD., under the trade name of "Si-Top", may preferably be employed as this amorphous-like fluorine resin. This "Si-Top" is a cyclized polymer having, as a monomer, perfluoro alkenyl vinyl ether having a pair of double bonds exhibiting different reactivities in a molecule, and is represented by the following chemical formula:

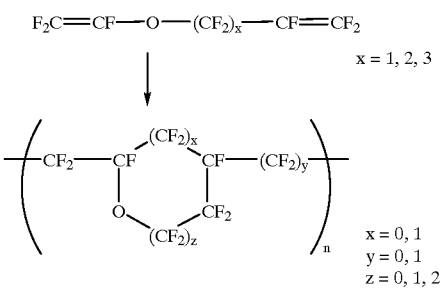

This "Si-Top", having a cyclic portion in its molecule, as shown by the above chemical formula, undergoes marked torsion in the main chain structure, such that it maintains a non-crystalline state without being able to assume a crystalline structure. Since the "Si-Top" is non-crystalline, as described above, it is readily soluble in a fluorine-based solvent, in distinction from the fluorine-based solvent.

Thus, if the surface-processed metal matrix material 1 is dissolved in a solution of "Si-Top" in a solvent, the coating film 3 mainly composed of the Si-Top can be formed on the surface processed film 2.

Since the "Si-Top" is not crystalline, it is formed as it is readily intruded into the holes 4 having a diameter not larger than 2 μm or into crevices 5 having a width not larger than 2 μm in the surface of the surface processed film 2. That is, in the present metallic material, the coating film 3 is formed in a state in which it is intruded into the holes 4 or crevices 5 in the surface processed film 2.

Specifically, for forming the coating film 3, the metal matrix material 1, surface-processed as described above, is impregnated in a solution containing the "Si-Top", or the solution containing the "Si-Top" is drawn under the effect of vacuum for impregnation in the surface of the surface processed film 2.

This metal matrix material 1 then is subjected to preliminary heat treatment. In this preliminary heat treatment, the metal matrix material 1 is heated to 20 to 70° C. at a temperature increasing rate of 5° C./min. This preliminary heat treatment is able to process the coating film 3 to a smooth uniform surface.

The surface processed film 2 then is polymerized with "Si-Top". In this polymerization step, the metal matrix material 1, subjected to the preliminary heat treatment, and the coating film 3, are subjected to heat treatment. In this heat treatment, the temperature of 70 to 250° C., is maintained for 10 to 60 minutes. With this heat treatment, the coating film 3 can be polymerized with the surface processed film 2. Specifically, the cyclic structure of tie "Si-Top" is collapsed at its terminal portion, as shown by the following formula:

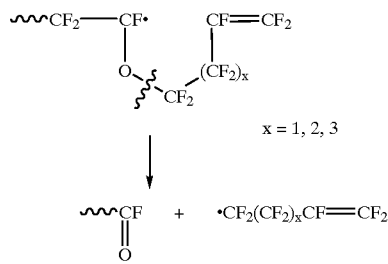

to form radicals and is cleft at its portion indicated by a wavy line to generate a polymer having a CF=O group in its terminal end.

Figure 2:
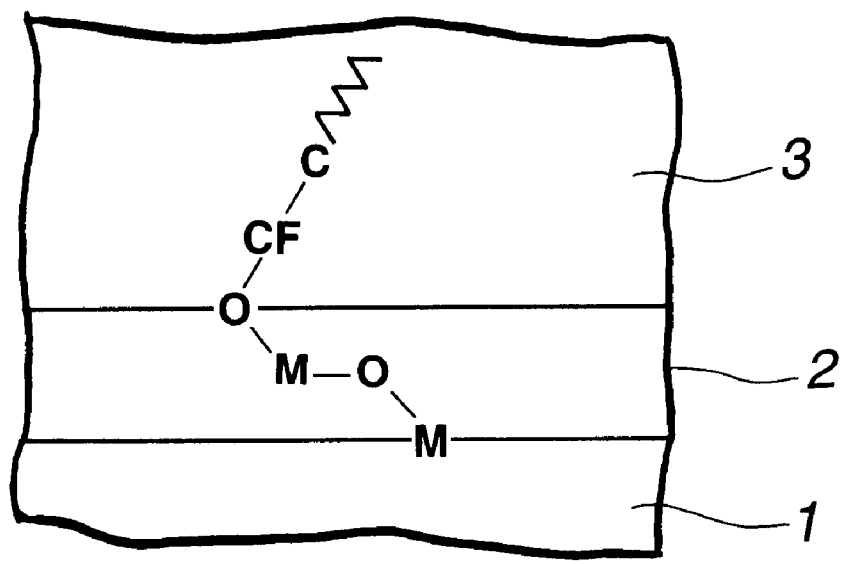
FIG. 2 is a schematic view showing the state in which an amorphous fluorine resin is polymerized on a surface processed film.

The reaction energy then is afforded by the heat treatment so that a polymer having a CF=O terminal group is polymerized with a metal atom of the surface processed film 2, indicated M in FIG. 2.

In the above-described polymerization process, the reaction energy is afforded by carrying out the heat treatment. This, however, is merely illustrative since any other suitable processing, such as low energy electron beam illuminating processing or ultraviolet light illuminating processing, capable of affording the reaction energy, can be used.

If the coating film 3 is to be a dual layer structure, the hydrophilic amorphous-like fluorine resin is first polymerized with the surface processed film 2 by the above-described technique. Then, hydrophobic amorphous-like fluorine resin is polymerized with the hydrophilic amorphous-like fluorine resin by the above technique.

Preferably, "Si-Top CTL-107M" is used as the hydrophobic amorphous-like fluorine resin, whereas "Si-Top CTX-109S" is used as the hydrophilic amorphous-like fluorine resin.

If the double-layer coating layer is to be formed, crystalline PTFE, PVDF, PVF, PEA or FEP may be used as an upper layer. If the second layer is hydrofluoric, resin releasing properties on using the metal material as the metal mold is improved appreciably.

The metal material, constructed as described above, has the coating film 3 polymerized with the surface processed film 2 in a state in which the amorphous-like fluorine resin is intruded into the extremely fine holes 4 or crevices 5. Thus, with the present metal matrix material, the coating film 3 is insusceptible to peeling such that the coating film 3 may be expected to display surface characteristic improving effect for prolonged time.

Also, with the above-described coating method, in which the amorphous-like fluorine resins are polymerized in the holes 4 or crevices 5, there is no necessity of enlarging these holes 4 or crevices 5. Thus, with the present technique, the coating film 3 can be formed extremely easily in the holes 4 or crevices 5.

Thus, with the present technique, since it is unnecessary to enlarge the holes 4 or crevices 5, the coating film 3 can be formed reliably even in case the coating film 3 is extremely thin in thickness. Stated differently, with the present technique, there is no risk of the size of the holes 4 or the crevices 5 being increased to cause the metal matrix material 1 to be exposed via the holes 4 or the crevices 5. Thus, with the present technique, the coating film 3 can be formed without the risk of damaging or corroding the metal matrix material 1.

Such metal material can be used as a metal mold for molding semiconductor devices, rubber molded articles or vessels of synthetic resin, water taps of water main or rotors of centrifuging machines for blood inspection. These metal components are unproved in wear resistance, corrosion resistance or resistance against chemicals as the result of surface processing of the metal matrix material 1. If used for these metal products, the metal material completely sheathes the fine holes or crevices formed on the surface processed film 2, by being intruded into the inside of these holes or crevices, thus improving resin releasing or improve resistance against contamination.

EXAMPLES

In the following, several Examples of the present invention of the coating method of the metal material according to the present invention and of actually employing the metal material are explained.

Example 1

In Example 1, the above-described metal material is applied to a metal mold used for manufacturing a semiconductor.

The metal mold for molding was of a die steel, tool steel or high-speed steel. The hard chromium plating processing was carried out on a metal matrix material, using a plating solution mainly composed of chromic acid, by way of surface treatment. The hard chromium plating film had a film thickness of 1 to 8 μm. The surface of the hard chromium plating film was impregnated with "Si-Top CTL-107M" by evacuation at 1 Torr, and was heated to 45° C. at a temperature raising speed of 5° C./min by way of preliminary heat treatment. The temperature of 200° C. was maintained for 30 minutes in order to polymerize the "Si-Top CTL-107M" with the hard chromium plating film.

Then, PTFE was impregnated on this "Si-Top CTL-107M". Heat treatment was carried out at 300° C. for 20 minutes in order to produce the CF-CF polymerization to cause intimate contact of the "Si-Top CTL-107M" with the PTFE film.

The metal mold for molding, thus prepared, was superior in resin releasing properties, such that molding could be carried out without producing malfunctions after use of 30,000 times. Conversely, the conventional metal molds for molding, employing biphenyl based epoxy resin, is poor in resin releasing properties and inferior in mold release properties.

Also, the conventional metal mold for molding uses an ejector pin with which to extrude and dismount the molded product. On the other hand, since the molding metal mold of Example 1 exhibits superior resin releasing properties, the molded article can be easily dismounted from the inside of the cavity without the necessity of thrusting the molded article with the ejector pin.

Example 2

In this Example 2, the above-described metal material is applied to a chamber inner wall component on which to mount excimer laser etc.

The chamber inner wall component, used for this excimer laser, may, for example, be an aluminum component processed with alumite forming or fluoriding treatment by way of surface processing. The surface of the metal component is impregnated with "Si-Top CTL-107M" by evacuation at a pressure of 1 Torr and heated to 45° C. at a temperature raising rate of 5° C./min by way of preliminary heat treatment. The temperature of 200° C. was maintained for 20 minutes for polymerizing "Si-Top CTL-107M" with the surface processed film.

FEP was then impregnated and coated on this "Si-Top CTL-107M" and heat treatment was carried out at 300° C. for 20 minutes for producing the CF-CF polymerization reaction to cause intimate contact of the "Si-Top CTL-107M" with the surface processed film.

The chamber inner wall section, thus prepared, is less susceptible to deposition of dust and dirt and superior in resistance against chemicals such that no malfunctions are recognized even after prolonged use for 700 hours or longer.

Example 3

In the Example 3, the above-described metal material was applied to a city water tap.

This city water tap was plated with decorative chromium plating by way of ultimate surface processing. The surface of the decorative chromium plating of the city water tap was impregnated with "Si-Top CTL-107M" containing TiO (1–20 g/l) by evacuation at a pressure of 1 Torr and heated to 45° C. at a temperature raising rate of 5° C./min by way of preliminary heat treatment. The temperature of 200° C. was maintained for 30 minutes for polymerizing "Si-Top CTL-107M" with the surface processed film.

The city water tap, thus manufactured, exhibits superior water-repellence as well as bactericidal properties. Thus, the city water tap is superior in water-repellence, while being free from contamination on its rear side even after use over approximately three months.

Example 4

In the present Example 4, the above-described metallic material is applied to a rotor of a centrifugal machine for blood inspection.

This rotor portion was processed with hard alumite coating 80 $\mu$m in thickness and impregnated with "Si-Top CTL-107M" by evacuation at a pressure of 1 Torr and heated to a temperature of 45° C. at a temperature raising rate of 5° C./min by way of preliminary heat treatment. The temperature of 200° C. was maintained for 30 minutes for polymerizing "Si-Top CTL-107M" with the surface processed film.

The "Si-Top CTL-107M" was impregnated and coated with PTFE and heat treatment was carried out at 300° C. for 20 minutes in order to produce the CF-CF polymerization reaction to cause intimate contact of the "Si-Top CTL-107M" with the surface processed film.

The rotor portion, thus prepared, is superior in resistance against chemicals, namely bactericidal agents. Thus, the rotor portion can be prohibited against corrosion by bactericidal agents, such that it can be used for prolonged time without corrosion even after immersion in a disinfectant for about two months.

What is claimed is:

1. A method for coating a metal substrate comprising:
    an immersion step of immersing a surface-processed metal substrate in a solution mainly composed of an amorphous-like fluorine resin;
    a polymerization step of polymerizing said amorphous-like fluorine resin and the surface processed metal substrate; and
    a step of forming a coating film on a surface-processed surface of said metal substrate.

2. The method for coating a metal substrate according to claim 1 wherein said surface processing is one of alumite coating processing, ion plating processing, chemical conversion coating processing and vapor deposition processing.

3. The method for coating a metal substrate according to claim 1 wherein said amorphous-like fluorine resin is of the perfluoro system and includes a terminal CF=O group in its terminal end.

4. The method for coating a metal substrate according to claim 1 wherein said coating film is made up of a hydrophilic amorphous-like fluorine resin, formed on the surface-processed metal substrate, and a hydrophobic amorphous-like fluorine resin formed thereon.

5. The method for coating a metal substrate according to claim 4 wherein
    the surface-processed metal substrate is immersed in a solution containing said hydrophilic amorphous-like fluorine resin or a surface of the surface-processed metal substrate is impregnated with a solution of the hydrophilic amorphous-like fluorine resin by evacuation;
    the resulting product is subjected to a preliminary heat treatment at a pre-set temperature; and subsequently the hydrophilic amorphous-like fluorine resin is polymerized to said surface-processed metal substrate.

6. The method for coating a metal substrate according to claim 5 wherein the surface of the metal substrate on which said hydrophilic amorphous-like fluorine resin is polymerized is immersed or impregnated with the solution of the hydrophobic amorphous-like fluorine resin by evacuation;

the resulting product is preliminarily that-treated at a pre-set temperature; and the hydrophobic amorphous-like fluorine resin is polymerized to said hydrophilic amorphous-like fluorine resin.

7. The method for coating a metal substrate according to claim 1 or 5 wherein, in said polymerization step, the amorphous-like fluorine resin is polymerized to said surface-processed metal substrate by a technique selected from among heating processing, low-energy electron beam illumination processing and ultraviolet ray illumination processing.

* * * * *